United States Patent

Murayama et al.

[11] 4,111,780
[45] Sep. 5, 1978

[54] APPARATUS AND PROCESS FOR THE ELECTROLYTIC TREATMENT OF ALKALI METAL HALIDE SOLUTION WITH ION EXCHANGE MEMBRANES

[75] Inventors: Naohiro Murayama; Makoto Fukuda; Teruo Sakagami; Shirou Suzuki; Yoshikazu Kokubu; Toshio Enoki, all of Iwaki, Japan

[73] Assignee: Kureha Kagaku Kogyo Kabushiki Kaisha, Tokyo, Japan

[21] Appl. No.: 743,294

[22] Filed: Nov. 18, 1976

[30] Foreign Application Priority Data

Nov. 19, 1975 [JP] Japan .................... 50-139074

[51] Int. Cl.$^2$ .................... C25B 1/16; C25B 1/26; C25B 9/00
[52] U.S. Cl. .................... 204/266; 204/98; 204/128; 204/180 P; 204/256; 204/301
[58] Field of Search .............. 204/263, 266, 252, 256, 204/258, 301, 98, 128, 180 P

[56] References Cited

U.S. PATENT DOCUMENTS 3,904,496 9/1975 Harke et al. .................... 204/98
3,959,095 5/1976 Marks et al. .................... 204/98

*Primary Examiner*—Arthur C. Prescott
*Attorney, Agent, or Firm*—Fleit & Jacobson

[57] ABSTRACT

This invention relates to an apparatus for the electrolytic treatment of alkali halide solution in a three chamber type electrolytic bath assembly comprising an anodic chamber, an intermediate chamber and a cathodic chamber arranged one after another in series. Each chamber is separated from its neighboring chamber by means of an anodic ion exchange membrane. The apparatus is characterized, according to this invention, in that the first one of the membranes separating the intermediate and anodic chambers is made of a fluorine-containing resin, while the second membrane separating the intermediate and cathodic chambers includes, as its main ion exchange radical, a pendant type phenolic radical or derivative thereof. The inventive process, which utilizes the above-described apparatus characterized in that it utilizes a caustic alkali concentration in the intermediate chamber which ranges from about 10 – 20 wt. % while the output caustic alkali developed at and delivered from the cathodic chamber amounts to a concentration ranging from about 30 to 50 wt. %.

15 Claims, 1 Drawing Figure

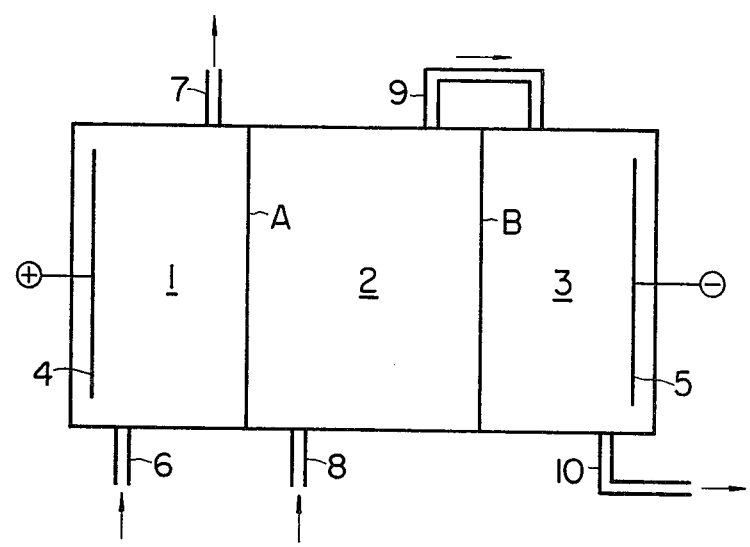

APPARATUS AND PROCESS FOR THE ELECTROLYTIC TREATMENT OF ALKALI METAL HALIDE SOLUTION WITH ION EXCHANGE MEMBRANES

BACKGROUND OF THE INVENTION

This invention relates to the process for electrolytic treatment of aqueous alkali halide solution using of ion exchange membranes, and more specifically, it relates to the above kind of process by use of a electrolytic bath assembly comprising an anodic chamber, an intermediate chamber and a cathodic chamber arranged in series each chamber being separated by an ion exchange membrane from its adjoining chamber.

The process for the electrolysis of aqueous alkali halide solution in a bath assembly fitted with selectively operating ion exchange membranes has hitherto been known. More recently, with remarkable development of fluorine containing resin-made, ion exchange membranes, this process has been practised on the industrial scale.

It has been experienced, however, that the current efficiency is appreciably reduced with increase of alkali concentration in the cathodic chamber, when an ion exchange membrane of the normally procurable kind and type is used. This is especially true, even with use of rather superior membranes providing as high as 80% or higher current efficiency at 20% or lower alkali concentration in the cathodic chamber, this current efficiency frequently becoming 50% or less when the alkali concentration increases to 30% or higher. It has already been proposed to provide an intermediate chamber between the anodic and cathodic chambers in order to avoid the above-mentioned disadvantage resulting from the increased alkali concentration in the cathodic chamber, so as to separate these chambers one after another by the provision of respective ion exchange membranes for the purpose of keeping the difference in the alkali hydroxide concentrations between the neighboring chambers as little as possible, as would necessary for the avoidance of current efficiency reduction. The number of such intermediate chambers may not be limited to only one, thus, it may be increased as occasion desires.

With increased number of such intermediate chambers for obtaining as little as possible difference in the concentrations in these chambers for improving the current efficiency, the number of the ion exchange membranes separating these chambers one from another would correspondingly, be increased, with increased interelectrode distances, thereby requiring a correspondingly increased voltage to be impressed.

It is, therefore, highly desirous to minimize the number of the intermediate chamber as such as possible, it being of still greater advantage to operate the process with a three chamber mode of the electrolytic bath assembly, the number of the intermediate chambers being thus limited to only one, thereby to obtain an operating current efficiency as high as possible.

We have extensively investigated, in order to realize a high efficiency process for obtaining high concentration aqueous caustic alkali solution with high current efficiency, the use of the three chamber mode of the electrolytic bath assembly comprising a cathodic, an intermediate, and an anodic chamber arranged in series and fitted with ion exchange membranes acting as the separating walls between the chambers.

It may be stressed that the ion exchange membrane acting as the separating wall between the anodic and the intermediate chamber must be highly durable to gaseous chlorine and caustic alkali present respectively in the anodic and the intermediate chamber. A most preferable one serving for this purpose is a fluorine-containing resin-made anodic ion exchange membrane. As results with the conventional two-chamber system, the current efficiency will appreciably decrease with increase of the caustic alkali concentration in the intermediate chamber which is comparable to the cathodic chamber in the known conventional system, and thus, the alkali concentration in the intermediate one should preferably be lower than 20%.

As the anodic ion exchange membrane acting as the separating wall between the intermediate chamber and the cathodic one may be made of any suitable substance if it is durable to caustic alkali. But, in practice, it must have a low electric resistance in aqueous caustic alkali solution and a high selective penetration performance to $Na^+$. Further, this membrane must have a moderate water penetration performance, since if an excess quantity of water should transfer from the intermediate chamber through the membrane to the cathodic chamber, the alkali concentration prevailing in the latter will be disadvantageously reduced.

As, conventionally, when all the quantity of caustic alkali formed in the intermediate chamber is transferred to the cathodic chamber of the three bath chamber system, the alkali concentration in the intermediate chamber must become disadvantageously high, when high concentration caustic alkali is to be attained at the cathodic chamber. In such case as above, the current efficiency will become highly inferior and under extreme conditions, the electrolytic apparatus does not operate properly, the operational troubles being caused by the too much high alkali concentration near the condensation state.

We propose, therefore, to separately take out the caustic alkali electrolytically formed in the intermediate chamber, or to transfer part or the whole thereof to the cathodic chamber so as to produce high concentration caustic alkali at the latter chamber, as an alternate measure.

According to our experiments, it has been found that in order to provide high concentration caustic alkali by high current and power efficiency with use of the three chamber type bath assembly with ion exchange membranes, the anodic ion exchange one acting as the separating wall between the intermediate chamber and the cathodic one, must have lower penetration performance to water as well as hydroxide radicals, and an especially small electric resistance value in the caustic alkali solution. For this purpose, we have found that those having phenol radicals acting as the ion exchange one are highly suitable.

BRIEF DESCRIPTION OF THE DRAWING

The objects, features and advantages of the present invention will become more apparent from the following detailed disclosure of preferred embodiments and numerical examples to be disclosed mostly with reference with to the accompanying drawing, representing schematically the three chamber type electrolytic bath assembly.

DETAILED DESCRIPTION OF THE INVENTION

In the drawing, the bath assembly comprises an anodic chamber 1, an intermediate chamber 2 and a cathodic chamber 3 arranged one after another into a unit and separated from each other by anodic ion exchange membranes "A" and "B", respectively, as shown. Numeral 4 represents an anode fixedly mounted within the anodic chamber or bath. Numeral 5 is a cathode fixedly mounted in the cathodic chamber or bath.

Anodic chamber 1 is provided with an inlet 6 through which saturated common salt brine is being fed continuously. The chamber 1 is further provided an outlet 7 through which diluted brine is being continuously taken out.

Intermediate chamber 2 is preferably fitted with an inlet 8 through which water or diluted caustic soda solution is continuously fed. The caustic soda solution formed in the intermediate chamber is taken out through an outlet, not shown, and in the form of a diluted caustic soda solution. Or alternatively, part or whole of the product is transferred through a communication pipe 9 to the cathodic chamber 3, so as to elevate the concentration of caustic soda. The thus concentrated caustic soda is being taken out continuously through an outlet 10.

In this case, when the ion exchange membrane "A" is the same and the caustic soda concentration and the current passage rate at the intermediate chamber are unchanged, it may naturally be expected that the quantities or rates of anodic ions and cathodic ions should be unchanged during continued operation of the electrolytic plant. Thus, as an example, the quantity or rate of $Na^+$-ions passing from the anodic chamber to the intermediate chamber will be unchanged.

Part of $Na^+$-ions thus conveyed to the intermediate chamber will react with $OH^-$-ions conveyed from the cathodic chamber to the intermediate one, to form caustic soda, while the remaining $Na^+$-ions will be conveyed through the membrane "B" to the cathodic chamber where they will form caustic soda.

The caustic soda formed at the intermediate chamber is taken out in the form of a dilute caustic soda, or alternatively, it will be conveyed therefrom through communication pipe 9 to the cathodic chamber, as above mentioned. It should be thus noted that all the $Na^+$-ions passed through the first membrane "A" will form caustic soda after all.

Further, it must be noted that the electric current efficiency of the electrolytic plant will vary in function of the passing conditions of $Na^+$-ions through the first membrane "A". Thus, this efficiency depends upon the alkali concentration prevailing in the intermediate chamber and kept in contact with the first membrane "A", and being not affected by the alkali concentration in the cathodic chamber and/or the conditions of the second membrane "B". For this reason, too much high alkali concentration at the intermediate chamber should be avoided.

In order to produce high concentration caustic soda with increased electric current efficiency, too much high alkali concentration at the intermediate chamber should be avoided, and thus, in turn, the difference in the alkali concentration between the intermediate and cathodic chambers must be kept as high as possible.

The alkali concentration at the cathodic chamber 3 depends upon the quantities of rates of water and $Na^+$-ions transferred to the cathodic chamber, while the quantity or rate of $Na^+$-ions depends upon the electric current (rate) and the current efficiency. These water and $Na^+$-ions consist of those which have been conveyed from the intermediate chamber 2 through second membrane "B" to cathodic chamber 3 and those which have been conveyed through communication pipe 9 and in the form of an aqueous caustic soda solution, the both being thus fed from the intermediate chamber.

The caustic alkali prevailing in the intermediate chamber is formed by the reaction of $OH^-$-ions transferred from the cathodic chamber thereto, being however, reduced by those which will further be conveyed towards the anodic chamber, with part of those $Na^+$-ions transferring from the anodic to the cathodic chamber. The concentration will depend upon the water quantity fed to the intermediate chamber, this water quantity or rate being the total sum of the water content supplied from the anodic chamber through the first membrane "A", and that supplied from outside through the inlet 8 as occasion may demand. However, this concentration will be increased so far by the water quantity or rate which is conveyed from the intermediate chamber through the second membrane "B" towards the cathodic chamber.

In other words, since water is transferred from the intermediate chamber through the second membrane "B" to the cathodic chamber, the alkali concentration in the intermediate one is reduced so far, while the concentration in the cathodic one is increased correspondingly. Still in other words when expressed conversely, the alkali concentration in the cathodic chamber will be reduced so far, with increase of the quantity of $OH^-$-ions conveyed from the cathodic chamber through the second membrane "B" towards the intermediate chamber, while the alkali concentration in the last mentioned chamber will increase correspondingly. With one and the same nature and structure of the anodic ion exchange membrane, the water penetration quantity will increase, and indeed, with increase of the electric current passage rate, as well as of the penetratingly transferring quantity of $Na^+$-ions. On the other hand, the penetrating quantity or rate of $OH^-$-ions will generally increase, with increase of penetratingly transferred quantity or rate of $Na^+$ ions. These quantities or rates will naturally vary, depending upon the nature and structure of the membrane.

According to our experimental observation, we have found that in the process for obtaining 30% or higher concentration of caustic alkali with 80% or higher electric current efficiency, it is highly recommended to use an ion exchange membrane "B", acting as the separating wall between the intermediate and cathodic chambers, having a water-penetrating rate of 3 g/A·h or less and a $OH^-$-ions-penetrating rate of 0.4 g/A·h or less, while keeping the alkali concentration (by weight percent) in the intermediate chamber at 10–20% and the alkali concentration in the cathodic chamber at 30–50%.

With use of such second membrane "B" having a higher water penetration quantity or rate than 3 g/A·h, and when keeping the caustic alkali concentration at 10–20%, substantial part of the water content, larger than the half fed to the intermediate chamber will penetrate through the membrane towards the cathodic chamber and thus, difficulties will be met in maintaining the cathodic alkali concentration at 30% or higher. On the other hand, with use of such second membrane having a higher $OH^-$-ions-penetrating power than 0.4 g/A·h, too much quantity of caustic alkali will be formed at the intermediate chamber and, thus, the alkali concentration prevailing therein will become higher than 20%.

As above mentioned, the anodic ion exchange membrane separating the intermediate and cathodic chambers must have a water penetration power lower than 3 g/A·h. For this purpose, the membrane must have lesser hydrophilic radicals as ion exchangeable one.

As for these radicals, and as examples, carboxylic radical; phenolic radical or substituted phenol-, mercapto- and phosphoric radical may be used. As most preferable type anodic ion exchange membranes, however, it may have a pendant type phenolic radical or its derivative, acting as the main ion exchange radical. Such a membrane as above has such favorable performances of lesser water and $OH^-$ -ion permeability and a lesser electric resistance in alkaline range.

As an example of such membrane material, a graft copolymer comprising a main chain structure of polyolefine having side chains of hydroxy styrene as main component wherein these side chains are grafted, preferably to a cross-linked structure. Under occasion, the graft copolymer may be sulfonated to a certain degree.

As the characterizing features of such phenol radical bearing-membrane material, it may be said that it represents lesser swelling capability to water and lesser electric resistance in aqueous alkali solution. As an example, even if it shows a resistance of 144 ohm-square centimeter in a 26%-NaCl aqueous solution, the value may decrease to only 12 ohm-square centimeter when operated in a 20%-NaOH aqueous solution. Such characteristic feature will be highly advantageous, since the membrane is always used in caustic alkali solution as in the case of the present invention.

The ion exchange membrane provided between the anodic and intermediate chambers must be durable to chemicals, especially to chlorine and acid in the anodic chamber; to caustic alkali prevailing in the intermediate chamber. Further, such membrane must represent a high current efficiency than 80%, more preferably than 85%, with the alkali concentration of 10–20% at the intermediate chamber.

As the preferred membrane material suitable for this purpose, a fluorine-containing resin may be used. As an example, a polymer or copolymer of at least one of the following monomers may be used: Ethylene tetrafluoride; propylene hexafluoride; ethylene trifluoride-chloride; ethyl trifluoride; vinylidene fluoride; $\alpha,\beta,\beta$-styrene trifluoride and the like. The above fluorine-containing monomer or monomers may be copolymerized with an olefine or olefines such as ethylene and propylene. These polymers or copolymers may have introduced therein ion-exchangeable radicals such as a sulfonic acid radical; a sulfuric acid radical, a carboxylic acid radical, and/or a phenolic radical, of which the most preferred is a sulfonic acid radical. The most preferable way for by introduction of these radicals is the polymerization. A further example of the fluorine-containing resin, such as a copolymer comprising a cyclic structure of structural units (A) and (B), and having pendant type sulfonic acid radicals, follows:

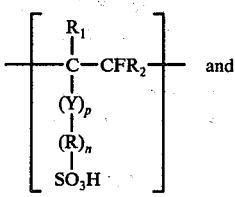  (A)

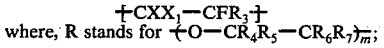  (B)

where, R stands for $+O-CR_4R_5-CR_6R_7\}_m$;

$R_1-R_7$ stand for fluorine or perfluoroalkyl radicals of $C_1-C_{10}$;

Y stands for a perfluoroalkyl radical of $C_1-C_{10}$;

$m = 0, 1, 2$ or $3$; $n = 0$ or $1$; $p = 0$ or $1$;

X stands for fluorine, chlorine, hydrogen or trifluoromethyl;

$X_1 = X$ or $CF_3(CF_2)_q$; $q = 0$ or an integer of 1–5;

A commercially procurable copolymer, as above the anti-chlorine and fluorine-containing resin-made, ion exchange membrane manufactured and sold by E. I. Du Pont under the registered trademark: "NAFION".

The ion-exchangeable radicals may be introduced into the fluorine-containing resin by chemical reaction therewith. As an example, sulfonic acid radicals may be introduced into a polymer comprising vinylidene fluoride units, and by chemical reaction therewith. As a further example, sulfonic acid radicals may be introduced into the benzene rings of a polymer of fluorostyrene by a chemical reaction. Styrene monomers, acrylic acid monomers or the like are graft-polymerized to respective polymers which are then subjected to a sulfonation, hydrolysis or the like treatment for the introduction of the ion-exchangeable radicals. Sulfonation, products of perfluorostyrene are especially highly useful to provide superior anti-chemical membranes, such as the said membrane "NAFION".

The aforementioned fluorine-containing resin-made anionic ion exchange membranes may have introduced therein inorganic ion exchangers including Zr; Bi; Ti; Ce, Sb; Sn and/or the like so as to increase the fixed cathodic ion concentration in the body of the membrane. Such improved membranes, when used, can improve the electric current efficiency by 5% or more, in comparison with those per se used in their original or otherwise state. For introducing the inorganic exchanger on or into the inside of the anodic ion exchange membrane, the latter can be treated with a solution including, by way of example, phosphoric acid, tungstic acid, molybdic acid, acid radical(s) thereof, their hydroxide and/or oxide by the way of coacting, dipping or impregnation, and then, it is brought into contact with a solution containing zirconium ions, or vice versa. As an alternative measure, when the occasion may desire, a gel product of zirconium salt, including said acid radical, hydroxide radical or the like, is prepared for coating or impregnating the ion exchange membrane substrate per se.

By the use of the inorganic ion exchanger-containing membrane of the fluorine-containing resin as above mentioned, the range of caustic alkali concentration to be kept at the intermediate chamber for attaining 80% or higher electric current efficiency can be substantially broadened. As an example, with use of the NAFION 315-membrane which does not include the inorganic ion exchanger of the above kind, the current efficiency will amount to 20% or so. By adopting the aforementioned improvement on the membrane, the caustic alkali concentration may be increased to 28% at superior current efficiency and with an output of high concentration caustic alkali as desired.

In the following, several numerical examples are given for a still better understanding of the present invention.

EXAMPLE 1

A three chamber type electrolytic bath assembly, containing an anodic, an intermediate and a cathodic chamber arranged one after another and separated with respective two ion-exchange membranes from each other, was used.

As the first membrane "A" separating the anodic and intermediate chambers, NAFION-315-membrane (to be called membrane No. 1 hereinafter), a composite one including NAFION EW-1100; NAFION EW-1500 and a mesh sheet of ethylene tetrafluoride resin, being laminated one after another, was used.

On the other hand, as the second membrane "B", separating the intermediate and cathodic chambers, a commercially procurable ion exchange membrane (to be called membrane No. 2 hereinafter), bearing phenolic radicals or its derivative and manufactured and sold by Maruzen Sekiyu K. K., of Tokyo, was used.

A hydrolitic treatment of aqueous NaCl brine was then carried out in the following way:

The anodic chamber was fed with aqueous saturated NaCl-solution and the intermediate chamber was supplied with water. The total quantity of aqueous NaOH-solution as produced at the intermediate chamber in the progress of the process was conveyed from the intermediate chamber to the cathodic one in an overflowing way, while high concentration NaOH product solution was taken out from the cathodic chamber.

The results are shown in the following Table 1.

The water penetration rate and $OH^-$-penetration rate of the anodic ion exchange membrane "B" were measured after removal of communication pipe 9 (shown and described previously). In this case, anodic chamber was fed with aqueous NaCl-solution of a constant concentration and intermediate and cathodic chambers were fed with aqueous NaOH-solutions of respectively constant concentrations. These conditions were so set that output of aqueous NaOH-solutions from the intermediate and cathodic chambers represented respective concentrations of about 19% and 39%. Then, the respective aqueous contents of the supplied NaOH-solution to the cathodic chamber and the discharged one therefrom, for a predetermined time duration, were measured, together with the corresponding aqueous consumption through the hydrolysis, as well as the penetrated aqueous quantities through both membranes, as determined by the respective electric current consumption rates thereat.

Further, the quantity of NaOH formed in the intermediate chamber was calculated, by measuring the quantities and concentrations of the supplied NaOH to and the discharged NaOH from the chamber, respectively. The quantity of $OH^-$ consumed in the formation of NaOH was also calculated. Further, the quantity of $OH^-$ transferred to the anodic chamber was calculated based upon the current efficiencies calculated from the quantities of NaOH in the intermediate and cathodic chambers. The thus determined sum of both $OH^-$-quantities was adopted as the $OH^-$-quantity transferred from the cathodic chamber to the intermediate one through the second membrane "B".

Table 1

| | |
|---|---|
| anode | titanium/ruthenium oxide |
| cathode | steel wire net |
| brine | 26%-aqueous NaCl-solution |
| bath temperature | 80° C |
| current density | 20 A/dm$^2$ |
| bath voltage | 4.0 V |
| NaOH-concentration, in intermediate chamber | 19% |
| NaOH-concentration in cathodic chamber | 39% |
| current efficiency | 82% |
| flow rate of NaOH, aq. through communication pipe | 1.34 g/A . h. |
| water penetration rate through membrane No. 2 | 1.49 g/A . h. |
| $OH^-$-penetration rate through membrane No. 2 | 0.22 g/A . h. |

EXAMPLE 2

NAFION-315 membrane was dipped in a 10%-solution of $ZrOCl_2 . 2H_2O$ in HCl of 1 N, for two hours and then taken out. The membrane surfaces were wiped with a filter paper. Then, the membrane was dipped in a 85%-$H_3PO_4$-solution for an hour, washed with fresh water and dried in a dryer at 160° C. for an hour. The first membrane "A", to be called membrane No. 3 hereinafter, was used as the separating wall between the anodic and intermediate chambers, while the second membrane "B", which was same as the membrane used in Example 1, was used as the separating wall between the cathodic and intermediate chambers. Other electrolytic conditions were same as in Example 1 for the production of NaOH from NaCl. The results are shown in Table 2.

Membrane-penetration rates of water and $OH^-$ were determined in the same way as adopted in the foregoing Example 1.

Table 2

| | |
|---|---|
| anode | titanium/ruthenium oxide |
| cathode | steel wire net |
| brine | 26%-aqueous NaCl-solution |
| bath temperature | 80° C |
| current density | 20 A/dm$^2$ |
| bath voltage | 4.2 V |
| NaOH-concentration, in intermediate chamber | 25% |
| NaOH-concentration in cathodic chamber | 44% |
| current efficiency | 85% |
| flow rate of NaOH. aq. through communication pipe | 1.65 g/A . h. |
| water penetration rate through membrane No. 2 | 1.64 g/A . h. |
| $OH^-$-penetration rate through membrane No. 2 | 0.27 g/A . h. |

EXAMPLE 3

As the first membrane "A", a laminated composite membrane NAFION-390-membrane (called membrane No. 4), comprising NAFION EW-1100; NAFION EW-1500 and a mesh sheet of ethylene tetrafluoride resin, was used, and as the second membrane "B" separating between the intermediate and cathodic chambers, same membrane No. 2 as used in the foregoing Example 1, was used. Other electrolytic conditions were same as disclosed therein for the treatment of NaCl. The results are shown in Table 3. Penetrated water and $OH^-$-quantities were determined as before.

Table 3

| | |
|---|---|
| anode | titanium/ruthenium oxide |
| cathode | steel wire net |
| brine | 26%-aqueous NaCl-solution |
| bath temperature | 80° C |
| current density | 20 A/dm² |
| bath voltage | 3.8 V |
| NaOH-concentration, in intermediate chamber | 12% |
| NaOH-concentration in cathodic chamber | 31% |
| current efficiency | 87% |
| flow rate of NaOH, aq. through communication pipe | 2.17 g/A . h. |
| water penetration rate through membrane No. 2 | 1.65 g/A . h. |
| OH⁻-penetration rate through membrane No. 2 | 0.19 g/A . h. |

EXAMPLE 4

As the membrane "A", NAFION-390 membrane (called membrane No. 4) was used, while, as the membrane "B", membrane No. 2 used in the foregoing Example 1, was used. Aqueous NaCl-solution was then subjected to electrolysis while water is being supplied to the intermediate chamber. Rather dilute NaOH-solution and rather thicker NaOH-solution were taken out concurrently and respectively from the intermediate and the cathodic chamber. The results are shown in Table 4.

Table 4

| | |
|---|---|
| anode | titanium/ruthenium oxide |
| cathode | steel wire net |
| brine | 26%-aqueous NaCl-solution |
| bath temperature | 80° C |
| current density | 20 A/dm² |
| bath voltage | 3.8 V |
| NaOH-concentration, in intermediate chamber | 10% |
| NaOH-concentration in cathodic chamber | 45% |
| current efficiency | 90% |
| taken-out NaOH-quantity from cathode chamber | 0.806 g/A . h. |
| taken-out NaOH-quantity from intermediate chamber | 0.537 g/A . h. |
| water penetration rate through membrane No. 4 | 2.11 g/A . h. |
| water penetration rate through membrane No. 2 | 1.66 g/A . h. |
| OH⁻-penetration rate through membrane No. 2 | 0.29 g/A . h. |

COMPARATIVE EXAMPLE

NAFION-315-membranes were used as the first and second membranes "A" and "B", concurrently. Other electrolytic conditions were same as those employed in the foregoing Example 1.

To the cathodic chamber, aqueous 30%-NaOH-solution was fed, while, to the intermediate chamber, aqueous 10%-NaOH-solution was fed. The water supply to the intermediate chamber and current passage conditions were so adjusted that the alkali concentration in the cathode chamber amounted to 30% and the electric current efficiency amounted to higher than 80%. The initial voltage was 5.0 V. After lapse of an hour from the start of the electrolysis, the impressed voltage rose gradually. It was found that gases accumulated in the communicating pipe 9 connecting between the intermediate and cathodic chambers. With further rise-up of the voltage, the temperature at the intermediate chamber rose suddenly and appreciably until the bath liquid began to boil. Further continuation of the electrolysis became thus impossible under these operational conditions.

When the water- and OH⁻-penetration rates at the NAFION-315-membrane were determined in the same way as before, they amounted to 3.53 g/A · h and 0.21 g/A · h, respectively.

From these results, it can be concluded that as the second membrane "B", the phenolic radical-bearing in the present invention can be better used for the purpose thereof.

The embodiments of the invention in which an exclusive property or privilege is claimed are as follows:

1. An apparatus for the electrolytic treatment of an aqueous alkali metal halide solution comprising:
    (a) an electrolytic bath assembly consisting of an anodic chamber, an intermediate chamber, and a cathodic chamber arranged in series;
    (b) said anodic chamber being provided with an anode, inlet means for introducing concentrated aqueous alkali metal halide solution into said anodic chamber, and outlet means for discharging dilute aqueous alkali metal halide solution from said anodic chamber;
    (c) said intermediate chamber being provided with inlet means for introducing water or dilute aqueous alkali metal hydroxide solution, wherein the alkali metal is the same as the alkali metal of the halide specified in part (b) above, into said intermediate chamber;
    (d) said cathodic chamber being provided with a cathode and outlet means for discharging concentrated aqueous alkali metal hydroxide solution from said cathodic chamber;
    (e) means for adjusting and maintaining the concentration of formed dilute aqueous alkali metal hydroxide in said intermediate chamber to a desired level comprising a hollow pipe positioned externally of said intermediate and cathodic chambers and having one of its ends communicating with the intermediate chamber and its other end communicating with the cathodic chamber, said hollow pipe serving as a passageway for the flow of dilute aqueous alkali metal hydroxide solution from the intermediate chamber to the cathodic chamber thus increasing the concentration of alkali metal hydroxide in the cathodic chamber any excess of which may be removed through the outlet means in said cathodic chamber to adjust and maintain the concentration of the alkali metal hydroxide in said cathodic chamber to a desired level;
    (f) a first anodic ion exchange membrane separating the anodic chamber from the intermediate chamber, said first membrane being durable to aqueous alkali metal hydroxide solution and gaseous chlorine and having a current efficiency exceeding about 80%; and
    (g) a second anodic ion exchange membrane separating the intermediate chamber from the cathodic chamber, said second membrane being durable to aqueous alkali metal hydroxide solution, having a low electrical resistance in aqueous alkali metal hydroxide solution, having high selective penetration performance to alkali metal ions, and having moderate water and hydroxyl ion penetration performance.

2. An apparatus for the electrolytic treatment of an aqueous sodium chloride solution comprising:

(a) an electrolytic bath assembly consisting of an anodic chamber, an intermediate chamber, and a cathodic chamber arranged in series;

(b) said anodic chamber being provided with an anode, inlet means for introducing concentrated aqueous sodium chloride solution into said anodic chamber, and outlet means for discharging dilute aqueous sodium chloride solution from said anodic chamber;

(c) said intermediate chamber being provided with inlet means for introducing water or dilute aqueous sodium hydroxide solution into said intermediate chamber;

(d) said cathodic chamber being provided with a cathode and outlet means for discharging concentrated aqueous sodium hydroxide solution from said cathodic chamber;

(e) means for adjusting and maintaining the concentration of formed dilute aqueous alkali metal hydroxide in said intermediate chamber to a desired level comprising a hollow pipe positioned externally of said intermediate and cathodic chambers and having one of its ends communicating with the intermediate chamber and its other end communicating with the cathodic chamber, said hollow pipe serving as a passageway for the flow of dilute aqueous sodium hydroxide solution from the intermediate chamber to the cathodic chamber thus increasing the concentration of sodium hydroxide in the cathodic chamber any excess of which may be removed through the outlet means in said cathodic chamber to adjust and maintain the concentration of the sodium hydroxide in said cathodic chamber to a desired level;

(f) a first anodic ion exchange membrane separating the anodic chamber from the intermediate chamber, said first membrane being durable to aqueous sodium hydroxide solution and gaseous chlorine and having a current efficiency exceeding about 80%; and (g) a second anodic ion exchange membrane separating the intermediate chamber from the cathodic chamber, said second membrane being durable to aqueous sodium hydroxide solution, having a low electrical resistance in aqueous sodium hydroxide solution, having high selective penetration performance to sodium ions, and having moderate water and hydroxyl ion penetration performance.

3. The apparatus of claim 2 wherein the second anodic ion exchanger membrane has a water-penetrating rate not exceeding about 3 g/A.h and a hydroxyl-ion-penetrating rate not exceeding about 0.4 g/A.h.

4. The apparatus of claim 2 wherein the first anodic ion exchange membrane is a homopolymer or copolymer of at least one monomer selected from the group consisting of ethylene tetrafluoride, propylene hexafluoride, ethylene trifluoride-chloride, ethyl trifluoride, vinylidene fluoride, and α,β,β-styrene trifluoride.

5. The apparatus of claim 2 wherein the first anodic ion exchange membrane is a copolymer of a monomer selected from the group consisting of ethylene tetrafluoride, propylene hexafluoride, ethylene trifluoride-chloride, ethyl trifluoride, vinylidene fluoride, and α,β,β-styrene trifluoride with an olefin selected from the group consisting of ethylene and propylene.

6. The apparatus of claim 4 wherein the homopolymers and copolymers also contain an ion-exchangeable radical selected from the group consisting of a sulfonic acid radical, a carboxylic acid radical, and a phenolic radical.

7. The apparatus of claim 2 wherein the first anodic ion exchange membrane comprises a sulfonic acid radical as its main ion exchanger.

8. The apparatus of claim 2 wherein the first anodic ion exchange membrane comprises a cyclic structure of (A) and (B) having the following formula:

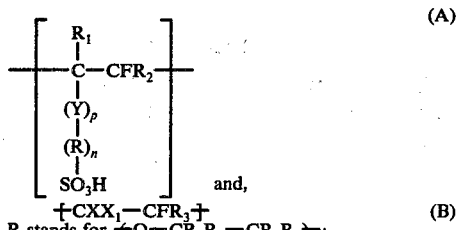

$R_1$–$R_7$ stand for fluorine or perfluoroalkyl radicals of $C_1$–$C_{10}$; Y stands for a perfluoroalkyl radical of $C_1$–$C_{10}$; $m = 0, 1, 2$ or $3$; $n = 0$ or $1$; $p = 0$ or $1$; X stands for fluorine, chlorine, hydrogen or trifluoromethyl; $X_1 = X$ or $CF_3(CF_2)_q$; and $q = 0$ or an integer of 1–5.

9. The apparatus of claim 2 wherein the first anodic ion exchange membrane contains an inorganic ion exchanger.

10. The apparatus of claim 9 wherein the inorganic ion exchanger is selected from the group consisting of zirconium, bismuth, titanium, cerium, antimony, and tin.

11. The apparatus of claim 2 wherein the second anodic ion exchange membrane comprises a member selected from the group consisting of a carboxylic acid radical, a phenolic radical, a substituted phenolic radical, a mercapto radical, and a phosphoric acid radical, as its main ion exchange radical.

12. The apparatus of claim 2 wherein the second anodic ion exchange membrane comprises a pendant-type phenolic radical or a derivative thereof as its main ion exchange radical.

13. The apparatus of claim 2 wherein the second anodic ion exchange membrane comprises a graft copolymer having a main chain structure of a polyolefine with side chains of hydroxystyrene as the main component, and wherein these side chains are grafted to a cross-linked structure.

14. The apparatus of claim 13 wherein the graft copolymer is sulfonated.

15. The apparatus of claim 2 wherein the first anodic ion exchange membrane comprises a fluorine-containing resin and the second anodic ion exchange membrane comprises a pendant-type phenolic radical or a derivative thereof as its main ion exchange radical.

* * * * *